(12) United States Patent
Rosenan et al.

(10) Patent No.: US 8,505,007 B2
(45) Date of Patent: Aug. 6, 2013

(54) METHOD AND SYSTEM FOR INSTANTLY CREATING AN IT ENVIRONMENT

(75) Inventors: Avner Rosenan, Tel Aviv (IL); Ophir Kra-oz, Tel Aviv (IL)

(73) Assignee: Cloudshare Ltd., Tel Aviv (IL)

( * ) Notice: Subject to any disclaimer, the term of this patent is extended or adjusted under 35 U.S.C. 154(b) by 249 days.

(21) Appl. No.: 12/676,144

(22) PCT Filed: Sep. 3, 2008

(86) PCT No.: PCT/IL2008/001189
§ 371 (c)(1),
(2), (4) Date: Dec. 13, 2010

(87) PCT Pub. No.: WO2009/031141
PCT Pub. Date: Mar. 12, 2009

(65) Prior Publication Data
US 2011/0131574 A1 Jun. 2, 2011

(51) Int. Cl.
*G06F 3/00* (2006.01)
(52) U.S. Cl.
USPC .................................. 718/1; 711/100; 710/1
(58) Field of Classification Search
None
See application file for complete search history.

(56) References Cited

U.S. PATENT DOCUMENTS

| | | |
|---|---|---|
| 2001/0007103 A1 | 7/2001 | Breiter et al. |
| 2003/0101189 A1 | 5/2003 | Lanzatella et al. |
| 2006/0074943 A1 | 4/2006 | Nakano et al. |
| 2006/0242211 A1 | 10/2006 | Becker et al. |
| 2008/0104591 A1* | 5/2008 | McCrory et al. .................. 718/1 |

* cited by examiner

*Primary Examiner* — Kenneth Tang
(74) *Attorney, Agent, or Firm* — Edward Langer, Adv and Patent Attorney

(57) ABSTRACT

A method to provide instant duplication of the machine images of an IT environment. The method is implemented by a system that includes a management server to oversee all operations, a storage controller, at least one host target machine of the IT Environment and at least one simple storage disk controlled by the storage controller. The method includes configuring each host target machine to access a logical drive as its hard drive, managing by the storage controller of the information inside each logical drive and storing the information on each of the at least one disks. The method also includes implementing the storage controller of two duplication algorithms. A third algorithm is provided for choosing between the first and the second duplication algorithms for each of the at least one disk elements in the IT environment.

11 Claims, 4 Drawing Sheets prior art Fig. 1a

METHOD AND SYSTEM FOR INSTANTLY CREATING AN IT ENVIRONMENT

CROSS-REFERENCE TO RELATED APPLICATIONS

The present Application is based on International Application No. PCT/IL2008/01189 filed on Sep. 3, 2008, which is based on U.S. Provisional Application No. 60/696,703 filed on Sep. 4, 2007.

FIELD OF THE INVENTION

The present invention generally relates to Information Technology (IT), and more particularly, to method and a system for instantly creating an instance of an IT environment after previously having an instance of its prototype.

BACKGROUND OF THE INVENTION

Reference is made to prior art FIG. 1a, a schematic block diagram of a group of laboratory machines before duplication, illustrating a prototype environment, which includes a plurality of different prototype machines. Each prototype machine has many attributes, such as type of hardware, whether it is a virtual machine, does it run on bare hardware, memory size, BIOS version, storage controller type, etc. There has been a major problem in the art in duplicating a machine in a timely manner. For example, for software trials, an IT environment is generally established by duplicating disks of prototype machines, assuming one has or can simulate the hardware. It takes both time and resources, such as I/O and disk space, to duplicate a machine's main disk in each machine's replication. An exemplary environment prototype 100 includes an environment machine prototype 101, an environment machine prototype 102 and an environment machine prototype 103.

Prior art systems generally implement a naïve duplication algorithm. Usually, the algorithm is better suited for duplication of an area in the disk that is changed frequently over time, such as for a swap file, or, alternatively better suited for a more static file system structure with many more read operations than write operations. Each algorithm has inefficiencies and other drawbacks. There is no really successful prior art for instantly creating IT environments. However, there is prior art for each algorithm in a different arena—backups.

Therefore, there is a need for a method to clone an environment machine prototype instantly, efficiently and effectively.

SUMMARY OF THE INVENTION

Accordingly, it is a principal object of the present invention to provide a method and a virtual storage system in which one can duplicate a machine image instantly, efficiently and effectively to a target host machine.

It is one other principal object of the present invention to provide an IT environment consisting of the following:
source machine images of disk and memory;
SAN/NAS storage data;
network topology; and
state of the target.

A Storage Area Network (SAN) is a network of storage devices, while a network attached storage (NAS) device is a server that is dedicated to nothing more than file sharing.

It is another principal object of the present invention to provide machine images of the IT Environment that are preferably kept in a storage repository, rather than in locally attached storage.

It is a further principal object of the present invention to provide a system that includes a management server, a storage controller, one or more host machines of the IT Environment and simple storage disks controlled by the storage controller.

A method is disclosed to provide instant duplication of the machine images of an IT environment. The method is implemented by a system that includes a management server to oversee all operations, a storage controller, at least one host target machine of the IT Environment and at least one simple storage disk controlled by the storage controller.

The method includes configuring each host target machine to access a logical drive as its hard drive, managing by the storage controller of the information inside each logical drive and storing the information on each of the at least one disks. The method also includes implementing by the storage controller of two duplication algorithms. A first algorithm is suited for duplication of an area in the at least one disk that is changed frequently over time and a second algorithm is suited for a more static file system structure with many more read operations than write operations. A third algorithm is provided for choosing between the first and the second duplication algorithms for each of the at least one disk elements in the IT environment.

The host machines can be either physical machines or virtual machines. Virtual machines (VM's) are instances of emulated machines running on a single host. Examples of current virtual machine mechanisms are the following VMware products: VMware Workstation; VMware ESX server; VMware Server; VMware Player; and VMware Fusion; Microsoft virtualization products: Virtual PC and Virtual Server; and open source project products: Xen; and Qemu. These are all referred to herein as machines.

Each machine is configured to access a logical drive as its hard drive. The logical drive is the entity which the storage controller exposes to the target hosts. The storage controller manages the information inside each logical drive and stores the information on disks. The storage controller may have many other roles that are not relevant to the present invention, such as, administration of redundancy of data, high availability, optimizing reads and writes, etc.

The storage controller implements two duplication algorithms. One algorithm is better suited for duplication of an area in the disk that is changed frequently over time, such as for a swap file. The other algorithm is better suited for a more static file system structure with many more read operations than write operations.

The present invention also provides a third algorithm for choosing between the two duplication algorithms for each disk element in a lab environment.

Additional features and advantages of the invention will become apparent from the following drawings and description.

BRIEF DESCRIPTION OF THE DRAWINGS

For a better understanding of the invention in regard to the embodiments thereof, reference is made to the accompanying drawings and description, in which like numerals designate corresponding elements or sections throughout, and in which:

FIG. 1a, is a prior art schematic block diagram of a group of laboratory machines before duplication;

DETAILED DESCRIPTION OF A PREFERRED EMBODIMENT

Figure 1B:
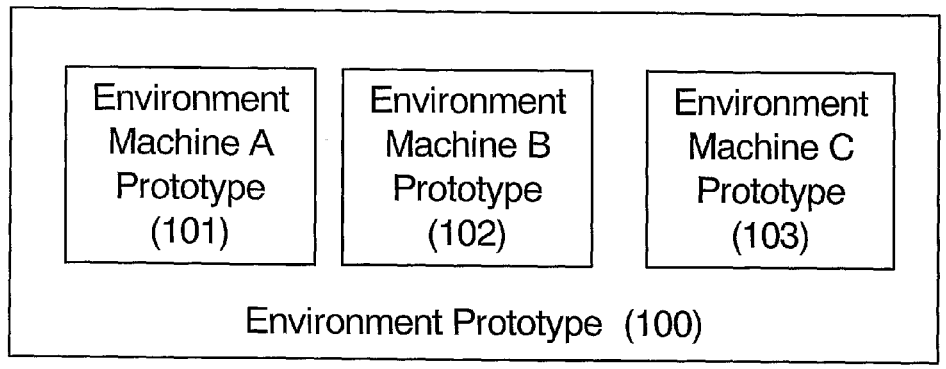
FIG. 1b, shows a schematic block diagram of a group of laboratory machines after duplication, constructed according to the method of the present invention.
Figure 1B:
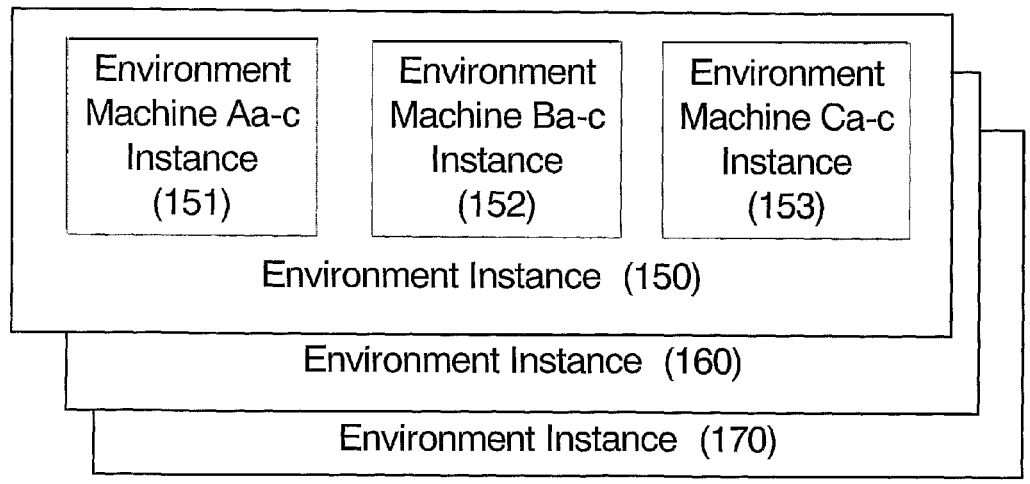

FIG. 1b, a schematic block diagram of a group of laboratory machines after duplication, constructed according to the method of the present invention. The environment instance 150 includes an environment machine Aa-c instance 151, an environment machine Ba-c instance 152 and an environment machine Ca-c instance 153. Other environment instances 160 and 170 are also shown.

Figure 2:
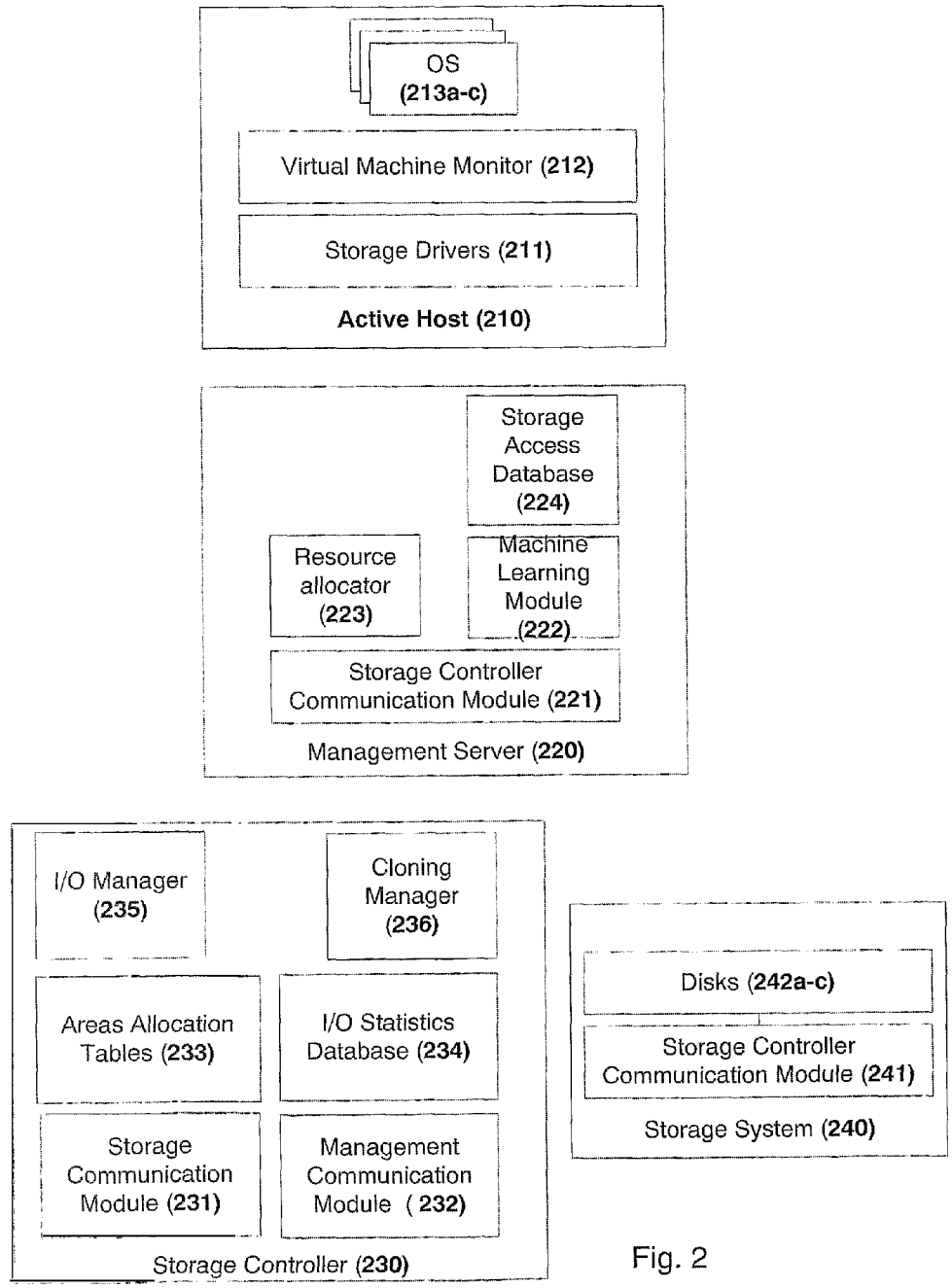
FIG. 2 is a schematic block diagram of a system for instantly duplicating a logical disk, constructed according to the principles of the present invention.

FIG. 2 is a schematic block diagram of a method for instantly duplicating a logical disk, constructed according to the principles of the present invention.

Instantly Duplicating a Relatively Static Disk

In this method the Storage Controller 230 accesses an additional logical disk from a prototype logical disk, immediately after a request from the Management Server 220. This request is answered by Storage Controller 230 with the ID of the new logical disk, according to which management server 220 can direct an active host machine 210, In the first step of this duplication, Storage Controller 230 allocates a table of areas in the logical disk in the Area Allocation Tables (AAT) 233. All entries in AAT 233 are initialized by the I/O Manager 235 according to the Storage Communications Module 231 and the Management Communications Module 232. These entries are preferably to be identical to the place to where this block in the source logical disk is pointing from among disks 242a-c.

In an alternative embodiment of the present invention, AAT 233 can be uninitialized at first, while keeping a bitmap of "dirty" areas (ones), and then initializing the bitmap to zeros, i.e., not dirty. When the bitmap says that an area is dirty, the main table's entry of AAT 233 for that page will point to the location in the disk from among disks 242a-c for that area.

When Storage Controller 230 gets a request for data in a logical disk from among disks 242a-c that is duplicated using this method, it first decides for which area this data is being requested. A request can be in terms of blocks, which are smaller than an area as discussed above. Then, it looks at the data table to see where to find the data for this particular area. In the bitmap embodiment, it looks at the bitmap. If the page is dirty it looks at the table, if not, it looks at the original logical disk's table of disks 242a-c for this area.

After the area's location is retrieved, it is easy to deduce the location of the block and read it from physical disks 242a-c.

When a data block is written to Storage Controller 230, Storage Controller 230 decides to which area this block belongs. Then, it finds out if the specified area is different between the new logical disk from among disks 242a-c and the original one of disks 242a-c by looking in both tables in the first embodiment, or just looking at the bitmap in the second embodiment. If the area is dirty, the block is written to the area pointed to by the table of the current image.

If the area is not dirty, Storage Controller 230 reads the entire area pointed to by the original logical disk from among disks 242a-c, allocates a new area in the Storage System 240 by means of the Storage Controller Communication Module 241, writes its address to the logical disk's table and writes the data read previously to that area. Then Storage Controller 230 writes the new block that it was requested to write to the new location. In the second embodiment the bitmap is flagged to dirty, and the rest of the process is the same.

All communication is performed by Storage Controller Communication Module 241. All read/write requests invoked by Storage Controller 230 to Storage System 240 are done by Storage Communication Module 231 sending a read/write packet to Storage Controller Communication Module 241 in Storage System 240. This communication can be done using any physical and/or transport protocol available. Common protocols are SCSI over Fibre Channel and SCSI over TCP/IP.

When Storage Controller 230 is requested to destroy the current logical image, Storage Controller 230 enumerates all dirty areas, de-allocating the storage used by the dirty areas, and then destroys the tables used by these logical disk from among disks 242a-c.

Instantly Duplicating a Massively Changing Logical Disk

In an alternative embodiment Storage Controller 230 also accesses an additional logical disk from a prototype logical disk immediately after a request from Management Server 220. This request is answered with an ID of the new logical disk that Management Server 220 can direct an active Host Machine 210 according to the Storage Controller Communications Module 221. Host Machine 210 includes the Storage Drivers 211, the Virtual Machine Monitor 212 and the various Operating Systems (OS) 213a-c.

Some data variables are associated with this copy of the logical disk. These variables point to the source logical disk, count how much of the logical disk was cloned (initialized to zero) and provide a bitmap that states which blocks have been written to the logical disk before they were cloned (also initialized to zeros).

After the request to create a clone of the logical disk has been answered, a process in the storage controller's cloning manager 236 begins. This process starts copying the original disk image's blocks one after the other in a serialized fashion. Each block is copied only if the bitmap value referring this block is zero. Each block that is copied raises the variable that counts how much of the logical disk is cloned. This variable will be incremented even if the block was not copied because the bitmap was 1.

When a block is being read from the logical disk, the storage controller checks if the block had been cloned already by checking if the block number is smaller than the counter of cloned blocks or if the bitmap for this block is 1. If the block is cloned, then the block is read from the cloned logical disk image. If not, it is read from the original.

When a block is being written to the logical disk, the storage controller checks if the block had been cloned already by the method discussed above. If so, the block that the new logical disk pages refer to is rewritten. If not, the storage controller allocates a new block, writing that block to the cloned logical disk's allocation table and flags the appropriate bit regarding this block in the bitmap.

Optimization for the Cloning Method

An alternative embodiment of the present invention can optionally skip cloning of irrelevant data blocks. These blocks can be blocks that are not used by any file system that is mounted on this disk. When cloning the logical disk, this space is reserved (as it is in the original disk), but not actually copied. In this way many I/O operations can be avoided on a disk that has unused space.

Choosing Between Two Duplication Algorithms:

The strategy is to gather data from previous experience on the same source logical disk, and to keep this data in the I/O Statistics database 234. Statistical data should be gathered, for instance, on how many dirty pages did a duplicated logical image have over time. Furthermore, one wants to know how many reads and writes there were to clean areas and how many to dirty areas.

This data is evaluated together with knowledge of the difference of the costs between storage space, read/write latency and I/O operations for each read/write operation, as well as data concerning which resources are more available for the system at the moment the request goes into a Machine Learning Module 222 for a decision regarding which duplication algorithm is presently more appropriate. This decision is based on information in the Resource Allocator 223 and the Storage Access Database 224.

Parameters gathered by the I/O Statistics Database 234 can be divided into two categories: general parameters and logical disk specific parameters.

General parameters include:
1. How much disk space is available?
2. A diagram of how much disk space will be available in the following hours (this prediction is also generated by the algorithm).
3. How many read operations are made to the disks?
4. How many write operations are made?
5. How many read/write operations are predicted for the following hours?
6. Cost (in terms of CPU/Memory/Time) of each copy-on-write operation.
7. Cost (in terms of CPU/Memory/Time) of cloning 1 MB of storage.
8. Average total CPU/Memory load on the controller.
9. Cost (in terms of CPU/Memory/Time) of each read operation using the frequent change algorithm.
10. Cost (in terms of CPU/Memory/Time) of each write operation using the frequent change algorithm that does not invoke the copy-on-write operation.
11. Same as 9 for the static/high read algorithm.
12. Same as 10 for the static/high read algorithm.

Logical disk specific parameters include:
1. Expected lifetime of this copy of the logical disk, which is calculated from past experience with clones of this particular logical disk.
2. How many write operations are done to distinct places in the disk, i.e., how many blocks would be copied on the copy-on-write operation?
3. Number of read operations in the expected entire lifetime.
4. Number of write operations in the expected entire lifetime.
5. Logical disk size.
6. Number of read/write operations per hour for the first hours of operation.

The standard deviation of all these parameters and the number of samples from which they are calculated are also kept.

A simple algorithm is optionally employed for evaluating the costs in the entire lifetime of this particular logical disk.

This is done by multiplying General Parameter (GP) #6 and Logical disk parameter (LDP) #2 plus multiplying GP #9 with LDP #3 plus multiplying GP #10 with LDP #4. The sum of these products is the cost of the first cloning method in the entire lifetime.

When multiplying GP #7 with LDP #5 plus GP #11 with LDP #3 plus GP #12 with LDP #4, one gets the costs of the second cloning method in the entire lifetime of the logical disk.

Because each cost discussed above (GP #6 and GP #7) is divided into 3 numbers—CPU cost of the storage controller, memory cost in the controller and the time it takes to perform, the operation, one wants to score each separately and give them a weight which will state how important this particular parameter is in this system.

For instance, if the memory is almost full, but the CPU is mostly Idle, the weight for memory in the calculation will be much higher than that of the CPU.

This algorithm has a very big flaw—it doesn't take into account the fact that the static/high read cloning algorithm is very resource intensive in the beginning of the operation, while the frequent change (simple cloning) algorithm uses the resources almost equally in its lifetime. This is demonstrated in FIG. 3.

Figure 3:
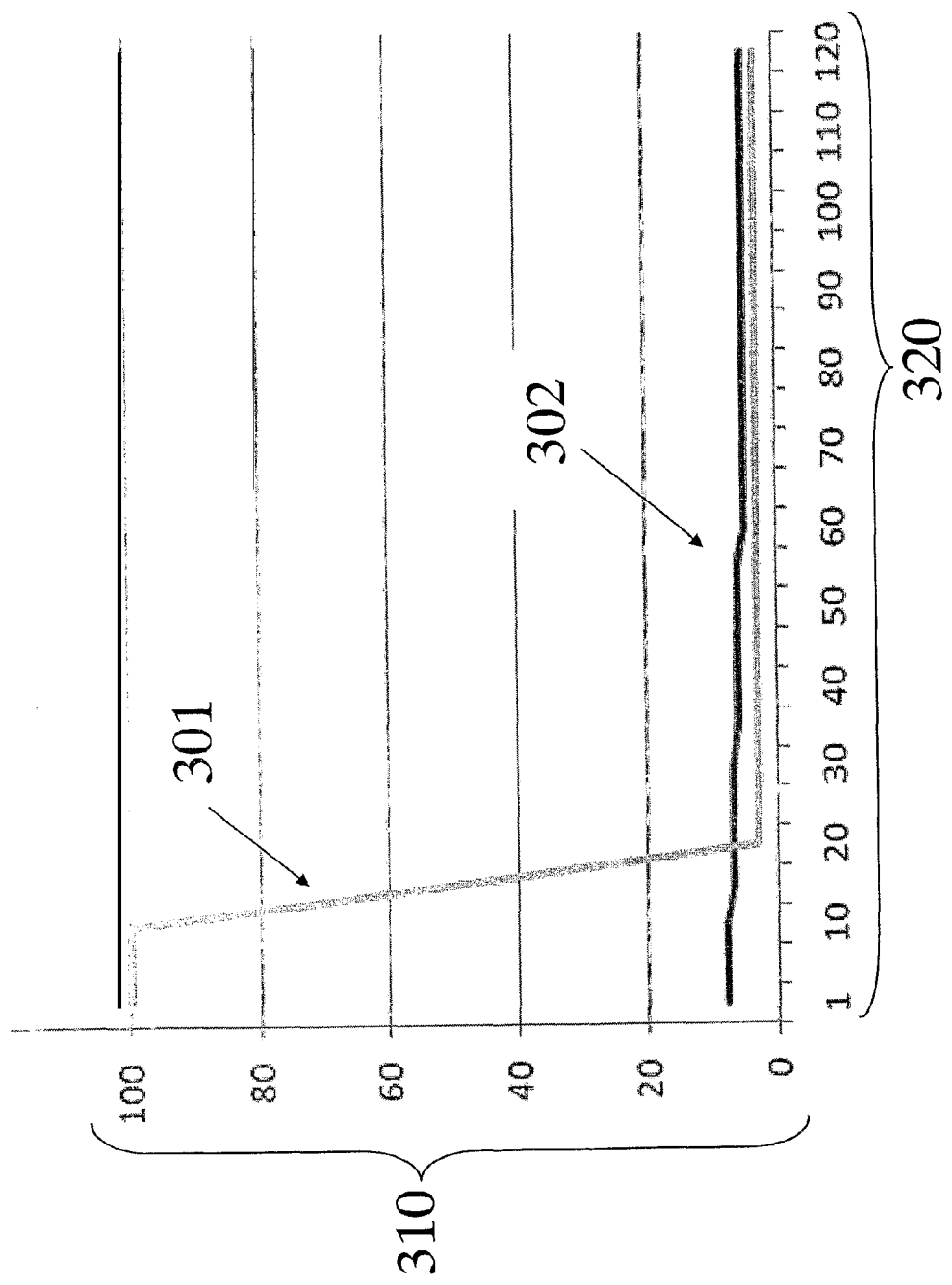
FIG. 3 is an exemplary graph of the number of CPU resources taken by the controller in each of the two cloning methods in the first 120 minutes of the operation, constructed according to the method of the present invention.

FIG. 3 is an exemplary graph of the number of CPU resources 310 taken by the controller in each of the two cloning methods in the first 120 minutes of the operation 320, constructed according to the method of the present invention. The frequent change (clone) method 301 uses much more CPU in the first 20 minutes when actually cloning the logical disk. After that it consumes much less CPU, because it should only check a flag, rather than a bitmap or a table, to determine from where to read, or where to write.

The resource consumption of frequent change (simple cloning) method 301 drops sharply after 20 minutes, but it will always be higher than the static/high read (differential clone) method 302 after the latter finishes copying the data from the original. The decline is because a preponderance of the places that change on the disk are changed at the beginning of the operation.

Of course, as long as the logical disk "lives longer," the overall cost of cloning it entirely is paying off because the differential cloning will always take more resources in the long run when the entire disk is overwritten.

Figure 4:
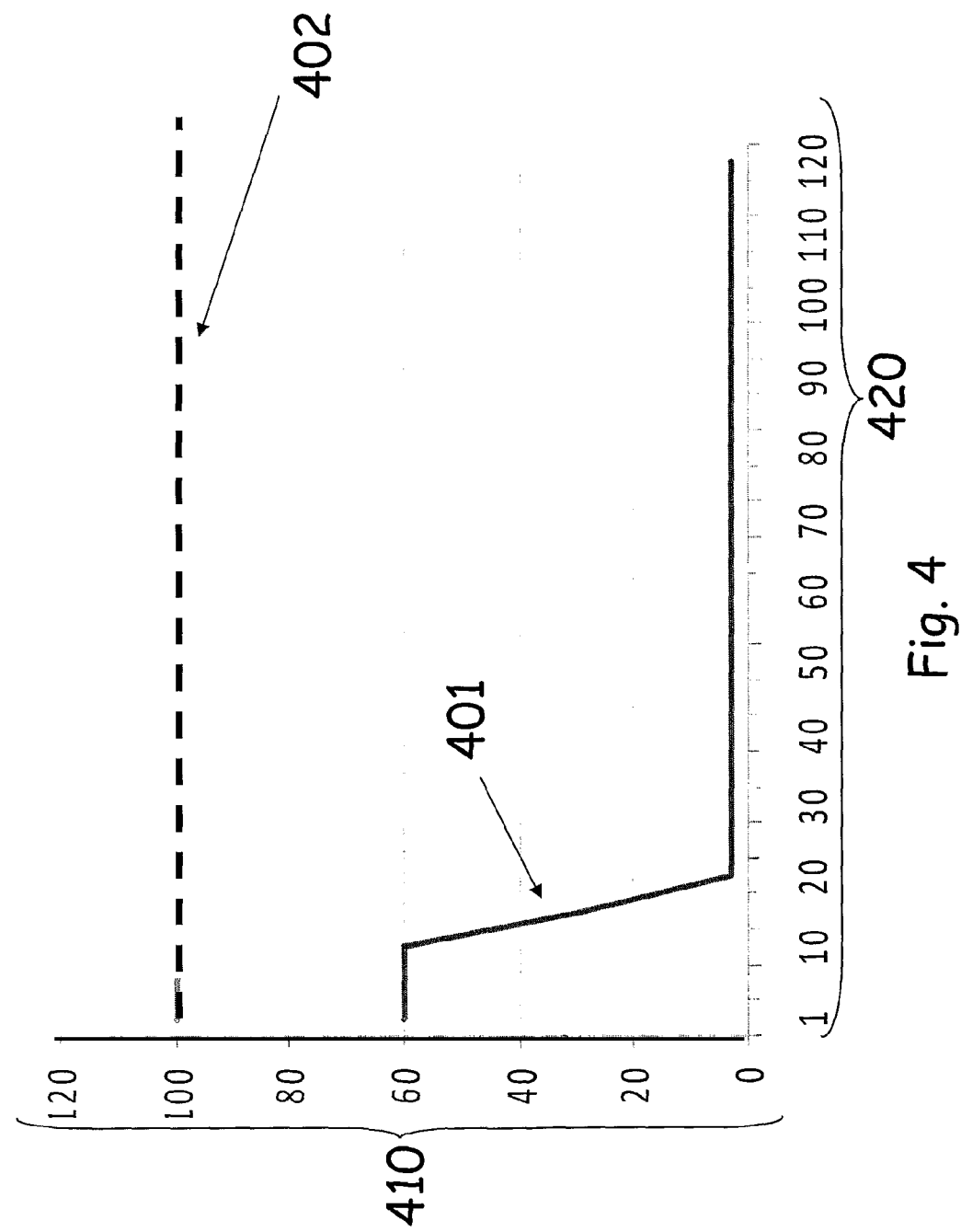
FIG. 4 is a graphical representation of exemplary memory usage over time, constructed according to the principles of the present invention.

FIG. 4 is a graphical representation of exemplary memory usage 410 over time 420, constructed according to the principles of the present invention. The frequent change (simple cloning) algorithm algorithm 402 is seen to free its bitmap table while the differential cloning algorithm 401 holds its bitmap table until the logical disk stops functioning.

Thus, the two algorithms behave differently in terms of CPU and memory in the first minutes of the operation. So a valid optimization to the decision algorithm above takes into account the predictions on the CPU and Memory usage of the confronter using both algorithms and calculates if it can allocate these resources in the predicted lifetime of the operation.

Another addition to this algorithm is provided by the space parameter. Of course, differential cloning can potentially take much less disk space than the full clone. The decision algorithm may also have a weight for that parameter, that relies heavily on GP #1 (and GP #2 when doing this calculation over time).

LDP #2 multiplied by the sector size gives the exact amount of space required by the first algorithm at the end of the disk's lifetime.

LDP #5 gives the amount of space needed for cloning.

Again, the decision can be made using predictions of the space available and the space required in the minutes/hours after the decision.

After the hybrid algorithm discussed in this section decides on one of the cloning algorithms, it should add the specific predictions it used to choose the winning algorithm to the general predictions of the available resources in the time following the decision is made.

Having described the present invention with regard to certain specific embodiments thereof, it is to be understood that the description is not meant as a limitation, since further modifications will now suggest themselves to those skilled in the art, and it is intended to cover such modifications as fall within the scope of the appended claims.

We claim:

1. A method to provide instant duplication of the machine images of an IT environment from a source logical disk to at least one target logical disk, implemented by a system comprising: a management server to oversee all operations; a storage controller; at least one host target machine of the IT Environment; and at least two storage disks controlled by said storage controller, wherein said method comprises: configuring each host target machine to access a logical drive as its hard drive; receiving a request for duplicating said source disk from said management server; accessing said logical drive; managing by said storage controller of the information inside each said logical drive, and storing the information on each of said at least one target logical disks; implementing by said storage controller of at least one of a first and a second duplication algorithm, wherein: said first duplication algorithm is suited for duplication of an area in said at least one target disk undergoing a plurality of changes over time relative to said second duplication algorithm providing a file system structure with many more read operations than write operations; wherein if both of said first and second duplication algorithms are implemented, said implementing step includes implementing a selection algorithm for choosing between said first and said second duplication algorithms for each element of said at least one target disk in the IT environment.

2. The method of claim 1, wherein said frequently changed area is for a swap file.

3. The method of claim 1, further comprising allocating a data table of areas in said at least one target logical disk.

4. The method of claim 3, further comprising initializing all entries in said allocation table.

5. The method of claim 3, further comprising keeping a bitmap of "dirty" areas (ones), and then initializing the bitmap to zeros, i.e., not dirty.

6. The method of claim 1, further comprising deciding for which area this data is being requested after said receiving as request step.

7. The method of claim 6, further comprising looking by said storage controller at said data table to see where to find the data for this particular area.

8. The method of claim 1, wherein said IT environment comprises: at least one disk having source machine images in memory storage; SAN/NAS storage data; network topology; and a state of the target appliance.

9. The method of claim 1, wherein said management server comprises at least one of: a storage controller communications module; a resource allocator; a machine learning module; and a storage access database.

10. The method of claim 1, wherein said storage controller comprises at least one of: an I/O manager; a cloning manager; areas allocation tables; an I/O statistics database; a storage communication module; and a management communication module.

11. The method of claim 1, wherein said system further comprises at least one of: an active host comprising at least one of: an Operating System; a virtual machine monitor; and storage drivers; and a storage system comprising at least one of: a plurality of disks; and a storage controller communication module.

* * * * *